Jan. 2, 1951 W. A. BENTLEY 2,536,712

PROTECTIVE SYSTEM

Filed May 27, 1947

INVENTOR.
William A. Bentley
BY Samuel B. Smith
ATTORNEY

Patented Jan. 2, 1951 2,536,712

UNITED STATES PATENT OFFICE 2,536,712

PROTECTIVE SYSTEM

William A. Bentley, Lancaster, Pa., assignor to Radio Corporation of America, a corporation of Delaware Application May 27, 1947, Serial No. 750,850

13 Claims. (Cl. 315—27)

Figures 1, 2:
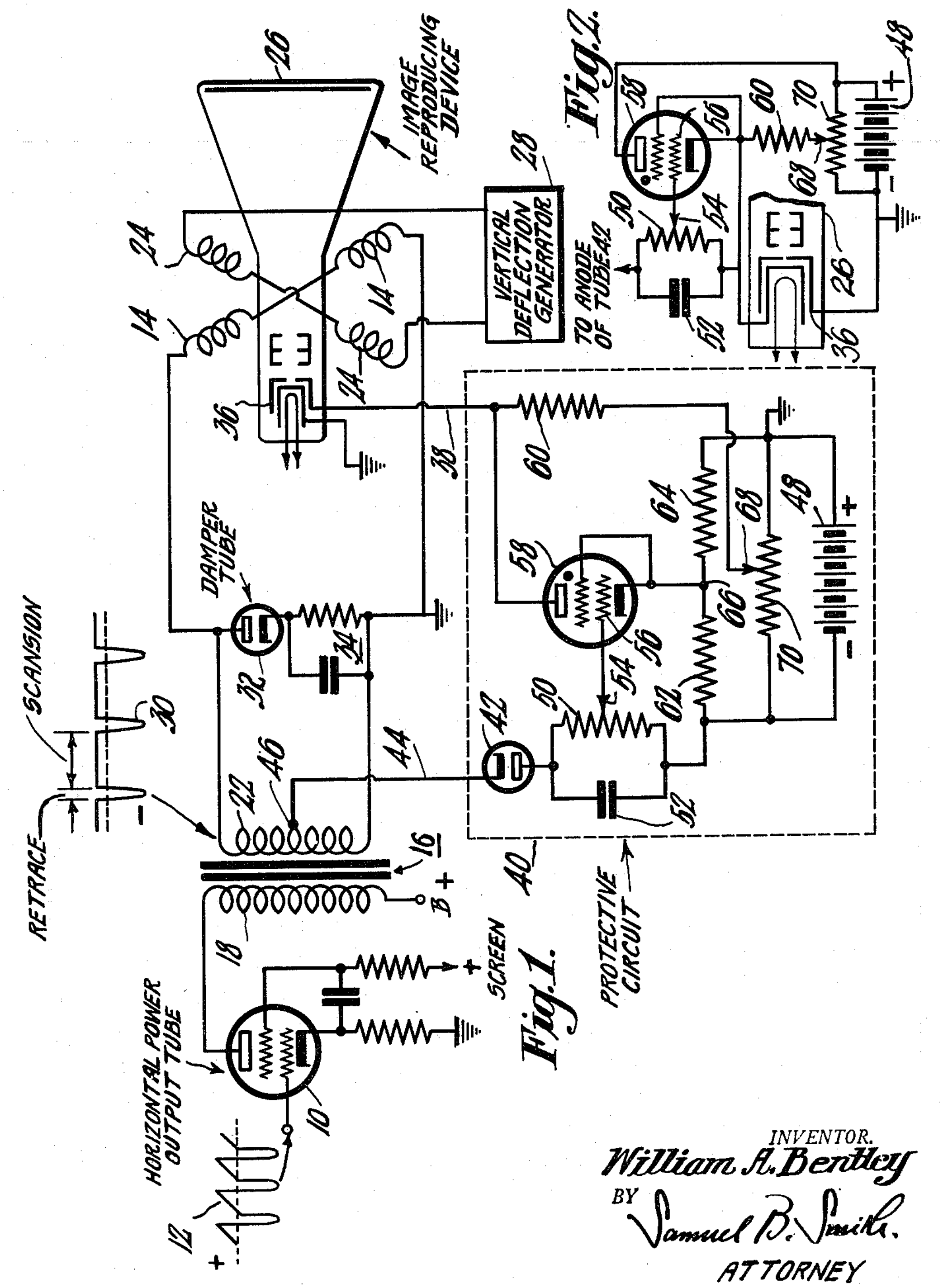

The present invention relates in general to a protective system for use in connection with electrical circuits incorporating electron discharge devices such as cathode ray tubes. In particular, the invention relates to means for preventing failure of some portion of an electrical circuit carrying cyclically varying energy from causing damage to the electron discharge tube, or tubes, forming part of the circuit. The invention is particularly adapted for the prevention of so-called "beam burns" on the luminescent screen of a cathode ray tube in which the electron scanning beam is normally caused to travel across the face of the tube at a relatively high rate of speed.

Television systems are known in the art in which the relatively high accelerating potential required for the anode of a cathode ray tube is obtained by rectification of the voltage surges developed across one winding of the horizontal output transformer during the retrace, or snapback, portion of each line-scanning cycle. When a pulse rectifier of this nature is employed, it follows that failure of some portion of the horizontal scanning circuit which acts to cut off production of these voltage surges will also cut off the supply of energy to the anode of the cathode ray tube.

Other known television systems, however, make use of a separate high-voltage source for energizing the cathode ray tube anode. This separate source, for example, may comprise a radio-frequency oscillator, a low-frequency power unit connected to the supply line, or even a series battery supply, although battery operation is found infrequently. In such an arrangement, it is apparent that failure of any part of the scanning circuit which acts to cut off production of the voltage surges normally developed across the deflection circuit inductance will have no direct effect on the potential of the cathode ray tube anode since, in this case, the high-voltage output is substantially independent of deflection.

The failure of either the horizontal or vertical deflection circuit, in a system such as set forth above, causes the cathode ray beam to be deflected in only one direction, producing a single line on the luminescent screen. If the beam current is sufficiently large, and if a high voltage is applied to the anode of the cathode ray tube, this line will be burned into the screen material and will produce a permanent blemish. If both deflection generators fail simultaneously, the cathode ray beam will remain stationary and will produce a burn or permanent discoloration at or near the center of the luminescent screen in a much shorter time than that required for damage by a single line. Relatively low beam currents and anode voltages will cause damage to the screen if the beam remains stationary, and the blemish produced is a spot similar to the ion spot that develops in certain types of electromagnetically deflected cathode ray tubes. The above injurious effects may also be produced if the scanning generators are intentionally or unintentionally disconnected while the separate high-voltage supply is still in operation.

The above will be more clearly understood when it is appreciated that present-day cathode ray tubes, especially those used in television applications, are operated at anode potentials ranging up to 80 kilovolts or even higher. The beam currents in such cathode ray tubes are usually low enough (in the order of several hundred microamperes, for example) so that relatively small amounts of power are dissipated. Ordinarily, the beam of the cathode ray tube is constantly in motion, both horizontally and vertically, and that portion of the released energy that is dissipated in the form of heat is distributed over a sufficiently large target area as to prevent damages to the luminescent screen material. (Of course, a portion of the beam energy is converted to light and does not contribute materially to heating of the screen.) If the motion of the beam ceases in one direction, the area of the target scanned by the beam is reduced to that area defined by the resultant line. Should beam deflection cease simultaneously in both directions, the area of the target involved is defined by the resultant spot produced by the stationary beam, the size of the spot being determined by beam intensity, anode voltage, and sharpness of focus. In either case, the target area involved has become small enough so that the heat dissipated may be sufficient to damage the luminescent screen material by decomposition if the beam intensity has not been sufficiently reduced. If the cathode ray tube is provided with an internal film of aluminum, this film will be permanently impaired. In fact, if the beam intensity is great enough and the beam remains motionless for a sufficient length of time, the heat generated may be enough to melt the glass face of the cathode ray tube at the area involved, producing a permanent blemish in the glass. The glass may even be weakened enough to cause the glass bulb to implode. To summarize the above, therefore, it may be said that, although the power dissipation in cathode ray tubes used for television purposes may be only in the order of a few watts on the average, this energy is concentrated over such a small area in the event of deflection failure that intense heat will be generated over that area unless the beam intensity is reduced sufficiently to avoid such a concentration of heat energy.

To remedy the above conditions in the event of failure of the beam deflection generators, a number of so-called protective systems have been devised. One method of this type is disclosed in a United States patent of Charles E. Torsch, No. 2,444,902, issued July 6, 1948. In this patent the output of the separate high-voltage power supply is fed to the second anode of the cathode ray tube through a rectifier tube, and the filament of this rectifier is heated by energy obtained from an additional winding on the horizontal output transformer. Accordingly, failure of horizontal deflection de-energizes the rectifier tube filament, and thus cuts off the anode voltage of the cathode ray tube by rendering the rectifier tube non-conductive. However, failure of the vertical deflection circuit of this character does not cut off the high voltage. Accordingly, a line or trace may remain on the tube and may be of such intensity as to burn or damage the fluorescent screen coating.

Other methods of protecting the cathode ray tube from damage make use of mechanical devices, such as relays, which are either energized or de-energized to cut off the high-voltage supply to the cathode ray tube in the event of deflection failure. Experience with such mechanically-controlled circuits, however, indicates that the protection which is obtained thereby is at times ineffective due to the time requirements, especially in the case of cathode ray tubes operating at potentials in the order of 30 kilovolts or above. At such voltages, and with average beam currents (say 100 microamperes), it is found that the luminescent screen of the cathode ray tube is damaged if the scanning spot remains motionless for as short a time as 1/60th of a second. Commercially available relays operated by some such means as a thyratron tube do not have sufficiently fast operation to provide complete tube protection. Investigation has shown that the operating period for a protective circuit of the nature set forth should not exceed the period required for one horizontal, or line, scanning interval—that is, the operating time should be in the order of approximately 60 microseconds or less.

In accordance with one preferred embodiment of the present invention, there is provided a circuit for protecting the electron discharge devices which form part of a circuit in which rectifiable energy is developed. In addition, the system of the present invention provides this protection without the use of elements having moving parts, such, for example, as relays. As a result of its all-electronic design, the circuit of the present invention may be made to operate within a very short period of time, and thus insures greater protection against damage to electron discharge tuebs than may be obtained with any system employing mechanical components.

When the present invention is employed in connection with a television deflection circuit (either line or field), a selected portion of the cyclic reactive energy which is developed across one winding of the output transformer during retrace is rectified so as to develop a substantially smooth D. C. (direct current) potential across the reactive element of a circuit consisting of a resistor and a capacitor in parallel and having a predetermined time constant. The magnitude of this potential will be proportional to the peak amplitude of the cyclic reactive energy. At least a portion of this developed D. C. potential is applied as a negative bias voltage to the control grid of a gas-filled tube, such as a thyratron, to maintain the latter in a non-conducting condition. Upon failure of the deflection circuit, however, no energy will be rectified, and since the time constant of the circuit providing the thyratron bias voltage is chosen to be in the order of the time required for one line-scanning (or field-scanning) operation, the bias on the thyratron will fall below the cut-off value of the tube within this period. The thyratron will then conduct to cause current to flow through a load resistor associated therewith. If the control grid of the cathode-ray tube is connected to the anode of the thyratron, a negative voltage of sufficient magnitude will be applied to the cathode ray tube control grid to cut off the scanning beam. Since, as above brought out, the thyratron will conduct within the period of one line-scanning operation (or field-scanning operation, as the case may be) of the cathode ray tube, it will be seen that the latter will be so biased, upon a failure of the deflecting means, as to cut off the cathode ray scanning beam within this same period of time.

One object of the present invention, therefore, is to provide a protective circuit for the electron discharge tube, or tubes in a system in which cyclically varying energy is present.

Another object of the present invention, in one embodiment, is to prevent a "beam burn" on the luminescent screen of a cathode ray tube upon failure of the deflecting power, the anode potential for the cathode ray tube being supplied from a separate source not directly related to the deflecting circuit.

A further object of the present invention, in one embodiment, is to provide means for cutting off the cathode ray scanning beam of an image-reproducing tube of the type used in television receiving systems, such means including a circuit for rectifying a portion of the cyclic reactive energy developed during operation of the deflecting circuit, and for applying this rectified energy to control the development of a voltage which in turn acts to cut off the said scanning beam.

Other objects and advantages will be apparent from the following description of a preferred form of the invention and from the drawing, in which Fig. 1 is a schematic representation of a protective circuit in accordance with the invention, and Fig. 2 is a modification of Fig. 1.

Referring now to the drawing and to Fig. 1 in particular, there is shown a cathode ray beam deflection circuit of the type which is particularly suited for use in television receiving systems, and which includes a horizontal, or line-frequency, power output tube 10. It will be understood, however, that although the present invention is being illustrated and described in connection with a horizontal, or line-frequency television deflection circuit, nevertheless, the invention is equally applicable to the vertical, or field, deflection circuit of a television receiver, or for any other cathode ray tube application in which the energy applied to deflect periodically the cathode ray scanning beam of the tube is capable of rectification to obtain a substantially smooth D.-C. potential. In its even broader aspects, the invention is adapted for use in other electrical circuits in which electron discharge devices are incorporated, such, for example, as to protect the power output tubes in the final stage of a transmitter in the event that the driving power for these tubes should fail. Still further applications of the invention will become apparent as the following description proceeds.

Tube 10 is adapted to supply, when voltage variations which may have a waveform such as indicated by the reference character 12 are applied to the control electrode thereof, cyclically varying current to a pair of horizontal, or line, cathode ray beam deflection coils 14 through a coupling transformer 16.

Transformer 16 is provided with a primary winding 18 and a secondary winding 22. The secondary winding 22 of transformer 16 is connected across the horizontal cathode ray beam deflection coils 14, as illustrated. These coils 14, together with a pair of vertical, or field, deflecting coils 24, preferably constitute a yoke assembly encircling the neck of a cathode ray image-reproducing tube, or kinescope, 26. The vertical cathode ray beam deflection coils 24 are energized by sawtooth current of field-scanning frequency from a deflection generator 28 which may be of any suitable design. It will not, therefore, be set forth in detail.

During operation of the illustrated circuit, negative voltage surges are produced during the retrace, or snap-back, periods of the cathode ray scanning beam of tube 26. These voltage surges appear across the secondary winding 22 of transformer 16, and may have a waveform such as indicated in the drawing by the reference numeral 30. A suitable damping arrangement is connected across all or a portion of the secondary winding 22 of transformer 16 in order to partially suppress high-frequency oscillations which would otherwise occur following retrace. This damping means has been illustrated as comprising a diode 32 in series with a parallel resistance-condenser combination 34, the voltage developed on the condenser of this resistance-condenser combination 34 during operation of the system serving as the bias voltage for the diode 32. The use of a diode damper tube to suppress high-frequency oscillations which would otherwise adversely affect deflection linearity is set forth in a United States patent of Alan D. Blumlein, Reissue No. 21,400, dated March 19, 1940. The operation of the damper tube 32 and its associated time constant circuit 34 will, therefore, not be described in detail in the present application. Furthermore, it is obvious that many other types of damping combinations may be substituted for the elements 32 and 34, such, for example, as the grid-controlled damping arrangement disclosed in Tolson United States Patent No. 2,280,733, granted April 21, 1942.

In accordance with the present invention, a protective circuit is provided for cutting off the cathode ray scanning beam of the image-reproducing tube 26 by application of a negative biasing potential to the control grid 36 of the tube over a conductor 38. This protective circuit is illustrated in the drawing within the broken lines 40, and includes a rectifier tube 42 the cathode of which is connected by means of a lead 44 to a tap 46 on the secondary winding 22 of transformer 16. The anode of the rectifier tube 42 is connected to the negative terminal of a battery or other source of potential 48 through a time constant circuit comprising a resistor 50 in parallel with a condenser 52. The resistor 50 may comprise part of a potentiometer having an adjustable tap 54, as shown.

Since the anode of rectifier tube 42 is connected to the negative terminal of the potential source 48 through the resistor 50, and since a positive voltage appears during scansion across the secondary winding 22 of transformer 16, it will be apparent that the diode 42 is non-conductive during each line-scanning interval. However, during the retrace periods of the cathode ray scanning beam of tube 26, a negative voltage of relatively high magnitude appears across the secondary winding 22. This voltage is represented by the pulses 30. A portion of these negative pulses 30 is applied to the cathode of the rectifier tube 42 over the conductor 44, and cause the rectifier tube 42 to conduct to rectify these negative voltage pulses 30. Condenser 52 will, therefore, be charged to some negative value determined by the position of the tap 46 on the transformer winding 22 relative to the grounded end of the latter. This voltage on condenser 52 will appear across the resistor 50.

The adjustable tap 54 on resistor 50 is connected to the control grid 56 of a gas-filled tube 58 which may be one of the "Thyratron" type. The position of tap 54 is so chosen that the negative bias on grid 56 derived from across all or a part of resistor 50 will maintain tube 58 nonconductive during normal operation of the scanning circuit—that is, as long as the amplitude of the negative pulses 30 does not fall below a predetermined normal value. Should the deflection circuit fail for any reason, however, the negative pulses 30 will no longer appear across the secondary winding 22, and hence no negative voltage will be applied to the cathode of the rectifier tube 42. In such an event, tube 42 will remain non-conductive, and the voltage appearing across condenser 52 will leak off through the resistor 50. The time constant of the RC combination 50, 52 is, as above stated, chosen to be in the order of one line-scanning interval—that is, substantially all of the voltage on condenser 52 will leak off through the resistor 50 within the period required to scan one line of the target area of the image-reproducing tube 26. At this point the gas tube 58 will have approached the conduction point and will conduct unless its bias voltage is restored during the retrace period.

This lowering of the negative bias voltage on the grid 56 of the tube 58 will cause the tube immediately to conduct, and current will flow through a load resistor 60 in the anode-cathode circuit of the tube to develop a negative voltage across resistor 60 relative to the positive end of battery 48 which is grounded. Since the upper end of resistor 60, or, in other words, that end of resistor 60 on which the negative voltage is developed, is connected directly to the control grid 36 of the image-reproducing device 26 through conductor 38, it will be apparent that this negative voltage will be effective to negatively bias the control grid 36 of tube 26. With a proper choice of component values, the magnitude of the developed voltage will be sufficiently high to completely cut off the cathode ray scanning beam of tube 26.

Two resistors 62 and 64 are connected in series across the potential source 48, and the cathode of the gas discharge tube 58 is connected to a point 66 therebetween. Thus the resistors 62 and 64 act as a voltage divider to maintain the cathode of the gas discharge tube 58 slightly positive with respect to its control grid 56, the latter being connected to the negative terminal of the potential source 48 through at least a portion of the resistor 50.

When the gas discharge tube 58 is non-conducting, the normal bias on the control grid 36 of the cathode ray tube 26 is determined by the position of the adjustable tap 68 of a potentiometer 70 which is connected across the potential source 48 in parallel with the series resistors 62 and 64. The positive end of source 48, being grounded, is at the same fixed potential as the cathode of tube 26.

It should be again emphasized that the values of resistor 50 and condenser 52 are so chosen that the condenser 52 will not discharge through the resistor 50 sufficiently to cause conduction through the gas discharge tube 58 as long as the normal scanning operation of the deflection circuit is maintained—that is, as long as the negative pulses 30 continue to be rectified in a normal manner by the tube 42. The time constant of the combination should be such as to maintain the gas discharge tube 58 at cut-off for a period equal to the time required to trace one line plus the period equal to approximately one half of the retrace or snap-back time interval. Under this condition the maximum negative bias of the gas discharge tube will be restored during the retrace interval before the bias decreases to the critical value at which conduction takes place. However, should the pulses 30 not be received for a period as short as one line-scanning interval, (the time required to trace one line and snap the beam back to begin a new line), then the voltage appearing across resistor 50 and capacitor 52 will drop to such a low value that the bias on the control grid 56 will be insufficient to maintain the cut-off condition of the gas discharge tube 58, and the latter will conduct to apply such a high negative bias to the control grid 36 of the image-reproducing tube 26 that the scanning beam of this tube will be cut off. This cycle of operation occurs in a sufficiently short period of time to prevent the stationary beam from burning, or otherwise damaging, the fluorescent screen or target of the cathode ray tube or any other of its associated parts. After operation of the deflecting circuit has been restored, the gas discharge tube 58 may be rendered non-conductive by adjusting the arm 68 of the bias potentiometer 70 so that the plate-cathode potential of the gas discharge tube is below the ionization point of the tube.

While the control grid 36 of the cathode ray tube 26 has been illustrated as being connected to receive negative bias from the anode of the gas discharge tube 58 over conductor 38, it will be obvious to those skilled in the art that the scanning beam of tube 26 may readily be controlled in other ways than that shown. For example, the load resistor 60 of the gas discharge tube 58 may be placed in the cathode circuit of tube 58, as shown in Fig. 2, and the anode of the tube 58 may be directly connected to the positive terminal of the bias supply 48 the negative terminal of which is grounded. Potentiometer 70 remains connected across the bias supply 48, but the arm 68 is now connected to the other end of resistor 60. The cathode of tube 26 is joined directly to the cathode of the gas discharge tube 58, and grid 36 of tube 26 is grounded. Resistors 62 and 64 may be omitted, and the anode of rectifier tube 42 may be connected through the parallel combination of capacitor 52 and resistor 50 to the cathode of the gas tube 58. Control grid 56 is connected to the resistor arm 54 as in Fig. 1. Any failure of deflection will cause the gas tube 58 to conduct as before, but with this connection a positive bias voltage is applied to the cathode (relative to grid 36) of the image-reproducing tube 26, producing cutoff of the scanning beam.

While a preferred embodiment of the present invention has been illustrated and described, it will be appreciated that the invention is broadly applicable to any system possessing rectifiable energy and in which a voltage variation derived therefrom may act to control the operative condition of one or more circuit elements. For example, in the television deflection circuit above set forth, a bias voltage need not be applied to the cathode ray tube 26 when a separate R. F. (radio frequency) power supply is employed to produce the tube accelerating potentials. In such an event, the protective circuit 40 may be utilized to cut off the plate current in the oscillator tubes in the R. F. power supply unit. In another example, a cathode ray tube having accelerating potentials derived from a surge type rectifier connected to the horizontal deflection transformer may be protected from damage due to failure of the vertical deflection circuit by connecting the input lead 44 of the protective circuit 40 to a point on the vertical deflection transformer, and by utilizing the output of the protective circuit 40 to cut off current in the horizontal power output tube or tubes upon such a vertical deflection failure.

It will also be appreciated that the rectifier tube 42 may be replaced with any other suitable type of rectifier, such as a selenium or copper-oxide disc arrangement. A rectifier of this general type has been described, for instance, by W. H. Falls in the "General Electric Review" for February 1947, volume 50, No. 2 on pages 34–38, inclusive. It is also within the scope of the invention to utilize a crystal rectifier or any other element possessing substantially unidirectional current-conducting properties. Crystals of this type have been well known and utilize generally an alloy, compound or mixture of germanium and some other element such as tin or nitrogen (purely by way of example) and have been developed largely at Purdue University at Lafayette, Indiana. A germanium crystal rectifier manufactured by Western Electric Company is known as the D-172925. Sylvania Electric Products, Inc., of Boston, Massachusetts also markets a crystal diode known as the 1N34 unit and this could be used at the point herein indicated to replace the diode rectifier 42 shown. It is only necessary that the particular rectifier employed has a sufficiently high voltage rating to withstand without breakdown the relatively wide voltage swings of the pulses applied to it from the transformer 16.

Various tube types for the gas discharge tube 58 may be employed depending upon the particular circuit components selected. Suitable tubes (although given in a purely illustrative and non-limiting sense) include those known as the 2D21; the 3C23; the 3D22; the 105; the 172; the 502-A; the 627; the 629; the 672; the 676; the 677; the 678; and the 2050 types.

I claim:

1. In a cathode ray beam deflection circuit of the type in which cathode ray beam deflection elements associated with an image-reproducing cathode ray tube are coupled to at least one power output tube, and in which the magnitude of the accelerating potential applied to the anode of said cathode ray tube is substantially independent of beam deflection, the combination of a circuit for rectifying at least a portion of the cyclic reactive energy developed across said deflection elements during retrace operation of said cathode ray tube deflection circuit, a gaseous discharge tube, means for applying a portion of the output of said rectifying circuit to said gaseous discharge tube as a negative bias potential to maintain said tube below its ionization point, means responsive to a drop in the value of said negative bias potential below a predetermined level for causing said gaseous discharge tube to be conductive, and means responsive to the conduction of said gaseous discharge tube for cutting off the electron scanning beam within said image-reproducing cathode ray tube during periods of conductivity of said gaseous discharge tube.

2. A cathode ray beam deflection circuit according to claim 1, in which said means responsive to the conduction of said gaseous discharge tube includes means for applying a bias potential to the control electrode of said image-reproducing cathode ray tube.

3. A cathode ray beam deflection circuit according to claim 1, in which said means responsive to the conduction of said gaseous discharge tube includes means for applying a positive bias potential to the cathode of said image-reproducing cathode ray tube.

4. The combination of claim 1, in which said rectifying circuit includes a parallel resistance-condenser combination having a time constant which is longer than the retrace operation between two deflections of said cathode ray beam.

5. In a cathode ray beam deflection circuit of the type in which cathode ray beam deflection coils associated with a cathode ray tube are coupled to at least one power output tube, and in which the magnitude of the accelerating potential applied to the anode of said cathode ray tube is substantially independent of beam deflection, the combination of a rectifier and a time constant circuit serially connected therewith between a point of stable potential and a point on said deflection coils, a grid controlled gaseous discharge tube, means for connecting the grid electrode of said gaseous discharge tube to a point on said time constant circuit, a voltage source, means for connecting the cathode of said gaseous discharge tube to an intermediate point on said voltage source, an impedance, means for connecting the anode of said gaseous discharge tube through said impedance to a point on said voltage source which is relatively positive with respect to the cathode of said gaseous discharge tube, and a connection between the anode of said gaseous discharge tube and the control electrode of said image-reproducing cathode ray tube.

6. In a cathode ray beam deflection circuit of the type in which a pair of cathode ray beam deflection coils associated with an image-reproducing cathode ray tube are coupled to at least one power output tube through a coupling transformer, and in which the magnitude of the accelerating potential applied to the anode of said cathode ray tube is substantially independent of beam deflection, the combination of a rectifier and a time constant circuit serially connected therewith between a point of stable potential and a point on said coupling transformer, a gaseous discharge tube, a connection from the control electrode of said gaseous discharge tube to a point on said time constant circuit, a voltage source, an impedance, circuit elements for connecting the cathode of said gaseous discharge tube through said impedance to a point on said voltage source which is positive with respect to said point of stable potential, means for connecting the anode of said gaseous discharge tube to a point on said voltage source which is relatively positive with respect to the cathode of said gaseous discharge tube, and a connection between the cathode of said gaseous discharge tube and the cathode of said image-reproducing cathode ray tube.

7. In a system for electro-magnetically deflecting the electron scanning beam of a cathode ray tube of the type in which an electron scanning beam is developed and then accelerated so as to strike a target area in said cathode ray tube, and in which system cyclic reactive energy is developed during a portion of each deflection cycle, the combination of a protective circuit including a rectifier and an electron discharge device, means for connecting said rectifier to rectify at least a portion of the said cyclic reactive energy developed by said system, means for applying at least a portion of said rectified energy to maintain said electron discharge device non-conductive, and means responsive to the conduction of said electron discharge device upon a predetermined drop in the value of the said rectified energy applied thereto for cutting off the electron scanning beam within said cathode ray tube.

8. In an electrical circuit including at least one normally-conductive electron discharge device, and in which circuit rectifiable energy is developed during a portion of the time of each cycle of operation thereof, the combination of means for rectifying at least a portion of the said rectifiable energy, means for deriving from the output of said rectifying means a bias potential which remains above a predetermined level during a time period approximately as long as one complete cycle of operation of said circuit, an electronic switching element, a connection for applying said bias potential to maintain said electronic switching element in open circuit condition, a connection between the output of said electronic switching element and said electron discharge device, and means responsive to a drop in the value of said bias potential below said predetermined level as a result of a cessation of normal operation of said electrical circuit to place said electronic switching element in a closed circuit state and thereby apply to said normally-conductive electron discharge device a voltage of such polarity and magnitude as to render said electron discharge device substantially non-conductive.

9. The combination of claim 8 in which said electronic switching element is a gaseous discharge tube, and in which the said bias potential is applied to the control electrode of said gaseous discharge tube to maintain the latter non-conductive.

10. In a cathode ray beam deflection circuit of the type in which a pair of cathode ray beam deflection coils associated with an image-reproducing cathode ray tube are coupled to at least one power output tube through a coupling transformer, and in which the magnitude of the accelerating potential applied to the anode of said cathode ray tube is substantially independent of beam deflection, the combination of a circuit for rectifying at least a portion of the cyclic reactive energy developed across said coupling transformer during a minor portion of the cycle of operation of said cathode ray beam deflection circuit, an electronic switching device, means for applying a portion of the output of said rectifying circuit to maintain said electronic switching device in open circuit condition, means responsve to a drop in the output of said rectifying circuit below a predetermined level to place said electronic switching device in a closed circuit current passing state, and a further circuit energized by the closed circuit state of said electronic switching device for interrupting the formation of the cathode ray beam within said image-reproducing cathode ray tube.

11. In an electromagnetic cathode ray beam deflection system of the type in which electrons are emitted from an electron-emitting electrode within a cathode ray tube and then formed into an electron beam which is accelerated so as to strike a target area in said cathode ray tube, and in which system cyclic reactive energy is developed during a portion of each deflection cycle, the combination of a protective circuit including a rectifier and an electron discharge device, means for connecting said rectifier to rectify at least a portion of the said cyclic reactive energy developed by said system, means for applying at least a portion of said rectified energy to maintain said electron discharge device non-conductive, and means responsive to the conduction of said electron discharge device upon a predetermined drop in the value of the said rectified energy applied thereto for preventing the electrons emitted from said electron-emitting electrode from striking the said target area in said cathode ray tube.

12. In a deflection system, a cathode ray tube having a cathode and another electrode adapted normally to provide an electron beam, a deflecting coil for said beam, means for cyclically energizing said coil, a gaseous discharge device, means for maintaining said device non-conductive during normal cyclic energization of said coil, means causing said device to become conductive upon failure of said coil energizing means, and means responsive to the conductive condition of said device to reduce the energy of the electron beam.

13. In combination with an electron discharge device having an electron-emissive cathode in which the emission has sufficient intensity to damage said device, means employing cyclically varying energy and operating on the electrons whereby such damage is prevented during normay operation of said device, a gaseous discharge tube, means responsive to said cyclically varying energy to maintain said tube in non-conductive condition during normal operation, means causing said tube to become conductive upon failure of said cyclically varying energy, and means responsive to the conductive condition of said tube to reduce the intensity of the cathode emission so that it is non-damaging to said device.

WILLIAM A. BENTLEY.

REFERENCES CITED

The following references are of record in the file of this patent:

UNITED STATES PATENTS

| Number | Name | Date |
|---|---|---|
| 2,261,776 | Poch | Nov. 4, 1941 |
| 2,265,620 | Bahring | Dec. 9, 1941 |
| 2,443,030 | Foster | June 8, 1948 |